(12) United States Patent
Goto et al.

(10) Patent No.: US 10,738,525 B2
(45) Date of Patent: Aug. 11, 2020

(54) VEHICLE OPENING/CLOSING BODY CONTROL DEVICE

(71) Applicant: AISIN SEIKI KABUSHIKI KAISHA, Kariya-shi (JP)

(72) Inventors: Ryu Goto, Toyota (JP); Ryo Asano, Kariya (JP); Ryujiro Akizuki, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 16/170,215

(22) Filed: Oct. 25, 2018

(65) Prior Publication Data
US 2019/0145145 A1 May 16, 2019

(30) Foreign Application Priority Data
Nov. 10, 2017 (JP) .................................. 2017-217587

(51) Int. Cl.
E05F 15/611 (2015.01)
H02P 29/00 (2016.01)
E05F 15/616 (2015.01)
H02P 1/02 (2006.01)
E05F 15/70 (2015.01)

(52) U.S. Cl.
CPC .......... *E05F 15/611* (2015.01); *E05F 15/616* (2015.01); *E05F 15/70* (2015.01); *H02P 1/02* (2013.01); *H02P 29/00* (2013.01); *E05Y 2900/546* (2013.01); *E05Y 2900/548* (2013.01)

(58) Field of Classification Search
CPC ....... E05F 15/611; E05F 15/616; E05F 15/70; H02P 1/02
See application file for complete search history.

(56) References Cited

U.S. PATENT DOCUMENTS

| 9,868,340 | B2* | 1/2018 | Nishikibe | ............... E05F 1/002 |
| 2015/0057895 | A1* | 2/2015 | Yamada | ................ E05F 15/659 |
| | | | | 701/49 |
| 2015/0096233 | A1* | 4/2015 | Kojima | ..................... H02P 3/14 |
| | | | | 49/31 |

FOREIGN PATENT DOCUMENTS

| JP | 2011-26941 | 2/2011 |
| JP | 6145444 | 6/2017 |

* cited by examiner

Primary Examiner — Anne Marie Antonucci
Assistant Examiner — Abdalla A Khaled
(74) Attorney, Agent, or Firm — Oblon, McClelland, Maier & Neustadt, L.L.P.

(57) ABSTRACT

A vehicle opening/closing body control device includes: an assist control unit that applies a voltage to a motor which drives an opening/closing body of a vehicle so as to perform an assist opening/closing actuation that assists a manual operation force with respect to the opening/closing body for performing an opening/closing actuation of the opening/closing body; and an actuation finish determination unit that determines whether or not a finish condition of the assist opening/closing actuation is satisfied, based on a change amount of an opening/closing speed of the opening/closing body per unit time, in which the assist control unit stops applying the voltage to the motor in a case where the finish condition of the assist opening/closing actuation is satisfied.

17 Claims, 6 Drawing Sheets

VEHICLE OPENING/CLOSING BODY CONTROL DEVICE

CROSS REFERENCE TO RELATED APPLICATIONS

This application is based on and claims priority under 35 U.S.C. § 119 to Japanese Patent Application 2017-217587, filed on Nov. 10, 2017, the entire contents of which are incorporated herein by reference.

TECHNICAL FIELD

This disclosure relates to a vehicle opening/closing body control device.

BACKGROUND DISCUSSION

JP 2011-26941A discloses an opening/closing device for a vehicle back door, which assists an opening operation of an operator by drive of a motor in a range from a start of the opening operation of the back door (opening/closing body) by the operator to a half-opened state.

Incidentally, since the opening/closing device continues the drive of the motor until the back door is in the half-opened state, the operator is unable to stop the back door at an optional position. Hence, there is room for improvement of the opening/closing device in terms of enhancement of the operator convenience. Thus, a need exists for a vehicle opening/closing body control device which is not susceptible to the drawback mentioned above.

SUMMARY

A vehicle opening/closing body control device according to an aspect of this disclosure includes: an assist control unit that applies a voltage to a motor which drives an opening/closing body of a vehicle so as to perform an assist opening/closing actuation that assists a manual operation force with respect to the opening/closing body for performing opening/closing actuation of the opening/closing body; and an actuation finish determination unit that determines whether or not a finish condition of the assist opening/closing actuation is satisfied, based on a change amount of an opening/closing speed of the opening/closing body per unit time. The assist control unit stops applying the voltage to the motor in a case where the finish condition of the assist opening/closing actuation is satisfied.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle opening/closing body control device (hereinafter, also referred to as a "control device") will be described with reference to the drawings.

Figure 1:
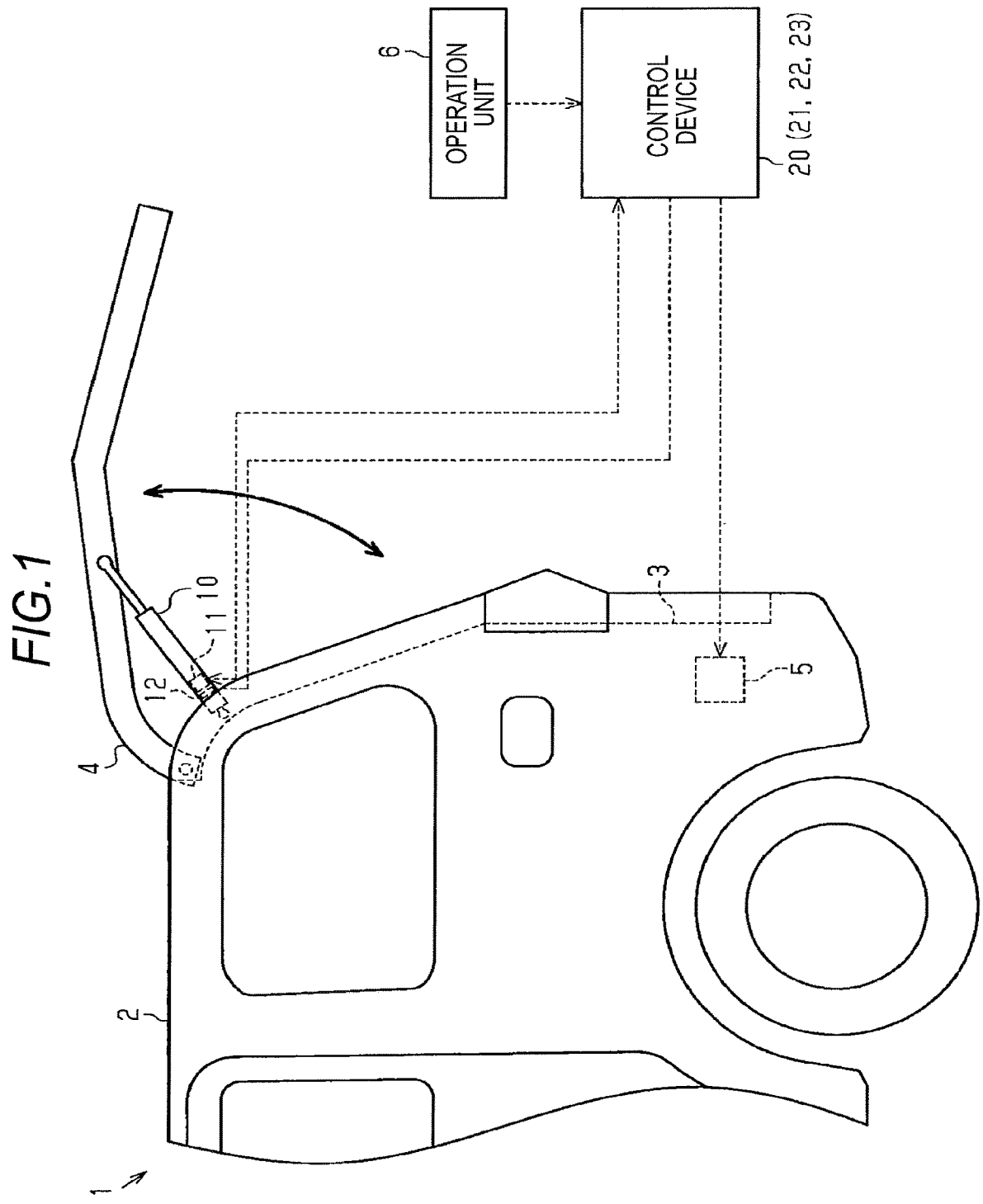
FIG. 1 is a schematic diagram of a vehicle including a vehicle opening/closing body control device according to an embodiment.

As illustrated in FIG. 1, a vehicle 1 includes a body 2 and a back door 4 as an example of an "opening/closing body" that opens and closes a door opening 3 which is open rearward of the body 2. In addition, the vehicle 1 includes a lock device 5 that restrains the back door 4 to the body 2, an operation unit 6 that is operated by an operator when an opening/closing actuation of the back door 4 is performed, an actuator 10 that drives the back door 4, and a control device 20 that controls the actuator 10.

The back door 4 is swingably supported by the body 2 between a fully closed position at which the door opening 3 is blocked and a fully open position at which the door opening 3 is open. The back door 4 has a rotation shaft extending in a vehicle width direction in a proximal portion that is supported by the body 2. Therefore, the back door 4 swings from the fully closed position to the fully open position such that a distal end portion on an opposite side to the proximal portion that is supported by the body 2 draws an arc.

The lock device 5 restrains the back door 4 that is positioned at the fully closed position to the body 2 or unrestrains the back door 4 from the body 2. The lock device 5 switches a state of restraining the back door 4 by an operation of the operation unit 6 or an electronic key (not illustrated) by the operator.

For example, the operation unit 6 is a push switch and outputs an operation signal to the control device 20 in a case of being operated by the operator. The operation unit 6 may be provided on the back door 4, may be provided on a console of the vehicle 1, or may be provided on the electronic key.

The actuator 10 includes a motor 11 as a drive source and a rotation angle sensor 12 that outputs a pulse signal in response to rotation of the motor 11. The actuator 10 is a linear movement actuator that extends and retracts by rotation of the motor 11. The actuator 10 has a first end and a second end in a longitudinal direction, the first end being connected to the body 2 and the second end being connected to the back door 4. In the actuator 10, the first end is rotatable with respect to the body 2, and the second end is rotatable with respect to the back door 4. In this manner, the actuator 10 applies a force for an opening actuation of the back door 4 during extension to the back door 4 and applies a force for a closing actuation of the back door 4 during retraction to the back door 4.

In this manner, in the embodiment, a power back door apparatus is configured of the back door 4, the actuator 10, and the control device 20.

In the embodiment, a rotation amount of the motor 11 (hereinafter, referred to as a "rotation amount R") has a correlation with a rotation amount of the back door 4 in that the rotation amount is proportional to an extension/retraction amount of the actuator 10. Similarly, a rotation speed of the motor 11 (hereinafter, referred to as a "rotation speed N") has a correlation with an opening/closing speed (swinging speed) of the back door 4 in that the rotation speed is proportional to an extension/retraction speed of the actuator 10. In this respect, in the embodiment, the rotation amount R and the rotation speed N of the motor 11 are described as an example of a variable indicating the swinging amount and the opening/closing speed of the back door 4.

Next, details of control of the opening/closing actuation of the back door 4 by the control device 20 will be described in detail.

A detection signal (pulse signal) of the rotation angle sensor 12 is input to the control device 20. The control device 20 acquires a position of the back door 4 based on the detection signal of the rotation angle sensor 12 or acquires the rotation amount R and the rotation speed N of the motor 11. The control device 20 controls the motor 11 based on various control variables including the rotation speed N of the motor 11 and controls the opening/closing actuation (opening actuation and closing actuation) of the back door 4.

To be more specific, the control device 20 executes an assist opening/closing actuation of assisting a manual operation force of an operator with respect to the back door 4 and performing the opening/closing actuation of the back door 4 by drive of the motor 11. Here, the manual operation force is a force (torque) that is applied to the back door 4 by the operator. In addition, in the following description, a force that is applied to the back door 4 by the motor 11 is also referred to as an assist force.

In addition, the control device 20 includes an actuation start determination unit 21 that determines whether or not a start condition of the assist opening/closing actuation is satisfied, an assist control unit 22 that controls a voltage that is applied to the motor 11, and an actuation finish determination unit 23 that determines whether or not a finish condition of the assist opening/closing actuation is satisfied.

The actuation start determination unit 21 (control device 20) determines whether or not the start condition of the assist opening/closing actuation is satisfied, based on the rotation amount R and the rotation speed N of the motor 11 in a case where the operator performs an opening/closing operation of the back door 4. To be more specific, the actuation start determination unit 21 determines that the start condition of the assist opening/closing actuation is satisfied in a case where the rotation speed N of the motor 11 does not decrease, and the motor 11 rotates at a predetermined determination rotation amount Rth or larger under a status in which the rotation speed N of the motor 11 is a predetermined start determination rotation speed Nth1 or higher.

In other words, the actuation start determination unit 21 determines that the start condition of the assist opening/closing actuation is satisfied in a case where the opening/closing speed of the back door 4 does not decrease, and the back door 4 swings at a "determination swing amount" or larger corresponding to the determination rotation amount under a status in which the opening/closing speed of the back door 4 is a "start determination speed" or higher corresponding to the start determination rotation speed Nth1. In this respect, in the embodiment, the start determination rotation speed Nth1 and the determination rotation amount Rth correspond to an example of a variable indicating the start determination speed and the determination swing amount.

Subsequently, a case where the start condition of the assist opening/closing actuation is satisfied, and a case where the start condition is not satisfied will be described with reference to a timing chart illustrated in FIGS. 2A and 2B.

Figure 2A:
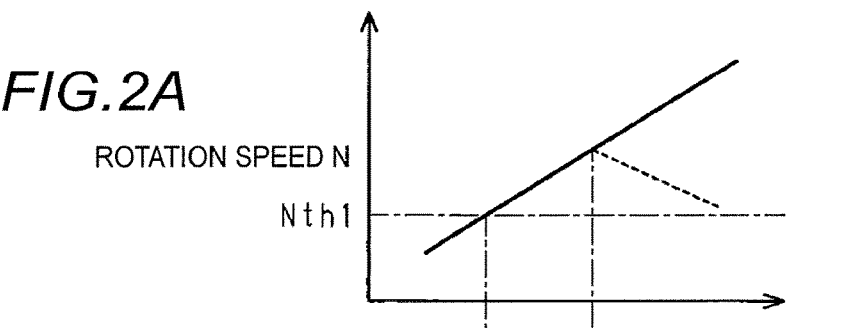
FIGS. 2A and 2B are timing charts illustrating a state in which a start condition of an assist opening/closing actuation is satisfied.
Figure 2B:
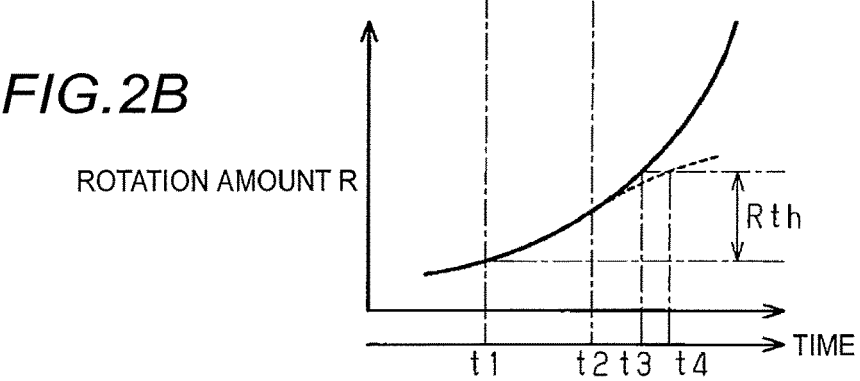

For example, as illustrated by a solid line in FIGS. 2A and 2B, in a case where the operator performs the opening/closing operation of the back door 4, the rotation speed N of the motor 11 is equal to or higher than the start determination rotation speed Nth1 at a first timing t1, and an integrated value of the rotation amounts R of the motor 11 from the first timing t1 is equal to or larger than the determination rotation amount Rth at a third timing t3. In addition, in a case illustrated by a solid line in FIGS. 2A and 2B, the rotation speed N of the motor 11 is equal to or higher than the start determination rotation speed Nth1, and the rotation speed N of the motor 11 does not decrease in a period from the first timing t1 to the third timing t3. Accordingly, in the case illustrated by the solid line in FIGS. 2A and 2B, the start condition of the assist opening/closing actuation is satisfied at the third timing t3.

By comparison, as illustrated by a dashed line in FIGS. 2A and 2B, in a case where the operator stops the opening/closing operation of the back door 4 at a second timing t2 between the first timing t1 and the third timing t3, the rotation speed N of the motor 11 from the second timing t2 decreases. An integrated value of the rotation amounts R of the motor 11 from the first timing t1 is equal to or larger than the determination rotation amount Rth at a fourth timing t4 later than the third timing t3. Incidentally, in a case illustrated by the dashed line in FIGS. 2A and 2B, although the rotation speed N of the motor 11 is equal to or higher than the start determination rotation speed Nth1, the rotation speed N of the motor 11 decreases in a period from the first timing t1 to the fourth timing t4. Accordingly, in the case illustrated by the solid line in FIGS. 2A and 2B, the start condition of the assist opening/closing actuation is not satisfied at the fourth timing t4.

For example, in the case illustrated by the dashed line in FIGS. 2A and 2B, in a case where the opening/closing operation of the back door 4 by the operator is re-started from a timing after the fourth timing t4, and the rotation speed N of the motor 11 increases, there is performed determination of whether or not the start condition of the assist opening/closing actuation from the timing is satisfied. In addition, it is preferable that the start determination rotation speed Nth1 and the determination rotation amount Rth are appropriately determined taking a likelihood of satisfaction of the start condition of the assist opening/closing actuation into consideration.

The assist control unit 22 (control device 20) starts the assist opening/closing actuation in a case where the start condition of the assist opening/closing actuation is satisfied, and the assist control unit finishes the assist opening/closing actuation in a case where a finish condition of the assist opening/closing actuation is satisfied. In addition, during the assist opening/closing actuation, the assist control unit 22 changes a voltage E that is applied to the motor 11 in a case where the rotation speed N of the motor 11 changes in response to a change in the manual operation force of the operator. To be more specific, during the assist opening/closing actuation, the assist control unit 22 increases the voltage that is applied to the motor 11 in a case where the rotation speed N of the motor 11 increases, and the assist control unit decreases the voltage that is applied to the motor 11 in a case where the rotation speed N of the motor 11 decreases.

In other words, during the assist opening/closing actuation, the assist control unit 22 increases the voltage that is applied to the motor 11 in a case where the rotation speed (opening/closing speed) of the back door 4 increases, and the assist control unit decreases the voltage that is applied to the motor 11 in a case where the rotation speed of the back door 4 decreases.

Figure 3A:
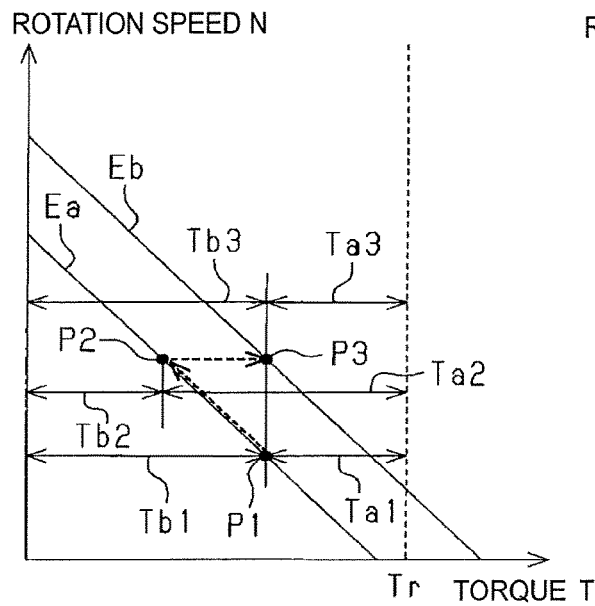
FIGS. 3A and 3B are graphs illustrating a change in voltage that is applied to a motor when a manual operation force changes during the assist opening/closing actuation.
Figure 3B:
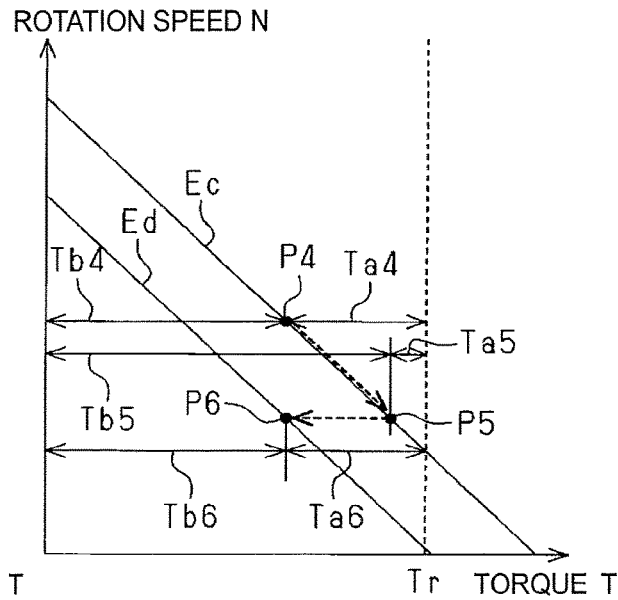

Subsequently, a case where the operator increases the manual operation force during the assist opening/closing actuation will be described with reference to FIG. 3A, and a case where the operator decreases the manual operation force during the assist opening/closing actuation will be described with reference to FIG. 3B. In FIGS. 3A and 3B, for easy understanding of the description, torque T on the horizontal axis represents torque (moment) that is applied to the back door 4 by the operator and the motor 11.

In FIG. 3A, Point P1 represents a status in which opening/closing torque Tr that is required for performing the opening/closing actuation of the back door 4 is output by a manual operation force Ta1 of the operator and an assist force Tb1 of the motor 11, during the assist opening/closing actuation. Under this status, when the voltage E that is applied to the motor 11 does not change, and the manual operation force Ta1 of the operator increases to a manual operation force Ta2, the opening/closing speed of the back door 4 increases. In this manner, the rotation speed N of the motor 11 increases, and thus the assist force Tb1 of the motor 11 decreases to an assist force Tb2 (Point P1 to Point P2). Therefore, in order to maintain the opening/closing speed of the back door 4, it is necessary to maintain a state in which the operator increases the manual operation force to the manual operation force Ta2.

In this respect, during the assist opening/closing actuation, the assist control unit 22 increases the voltage E that is applied to the motor 11, thereby suppressing a decrease of the assist force of the motor 11 in a case where the rotation speed N of the motor 11 increases (Point P2 to Point P3). In a case illustrated in FIG. 3A, the assist control unit 22 changes a voltage Ea that is applied to the motor 11 to a voltage Eb. Here, an assist force Tb3 of the motor 11 at Point P3 is an assist force equal to the assist force Tb1 of the motor 11 at Point P1 representing a state before the operator increases the manual operation force. That is, the assist control unit 22 determines the voltage E that is applied to the motor 11 such that the manual operation force of the operator is constant during the assist opening/closing actuation, regardless of the rotation speed N of the motor 11.

As a result, a manual operation force Ta3 at Point P3 representing a state after the rotation speed N of the motor 11 increases is equal to the manual operation force Ta1 at Point P1 representing a state before the rotation speed N of the motor 11 increases.

In FIG. 3B, Point P4 represents a status in which the opening/closing torque that is required for performing the opening/closing actuation of the back door 4 is output by a manual operation force Ta4 of the operator and an assist force Tb4 of the motor 11, during the assist opening/closing actuation. Under this status, when the voltage E that is applied to the motor 11 does not change, and the manual operation force Ta4 of the operator increases to a manual operation force Ta5, the opening/closing speed of the back door 4 decreases. In this manner, the rotation speed N of the motor 11 decreases, and thus the assist force Tb4 of the motor 11 decreases to an assist force Tb5 (Point P4 to Point P5). Therefore, in order to maintain the opening/closing speed of the back door 4, it is necessary to maintain a state in which the operator decreases the manual operation force to the manual operation force Ta5.

In this respect, during the assist opening/closing actuation, the assist control unit 22 decreases the voltage E that is applied to the motor 11, thereby suppressing an increase of the assist force of the motor 11 in a case where the rotation speed N of the motor 11 decreases (Point P5 to Point P6). In a case illustrated in FIG. 3B, the assist control unit 22 changes a voltage Ec that is applied to the motor 11 to a voltage Ed. Here, an assist force Tb6 of the motor 11 at Point P6 is an assist force equal to the assist force Tb4 of the motor 11 at Point P4 representing a state before the operator decreases the manual operation force. That is, the assist control unit 22 determines the voltage E that is applied to the motor 11 such that the manual operation force of the operator is constant during the assist opening/closing actuation, regardless of the rotation speed N of the motor 11.

As a result, a manual operation force Ta6 at Point P6 representing a state after the rotation speed N of the motor 11 decreases is equal to the manual operation force Ta4 at Point P4 representing a state before the rotation speed N of the motor 11 decreases.

Figure 4:
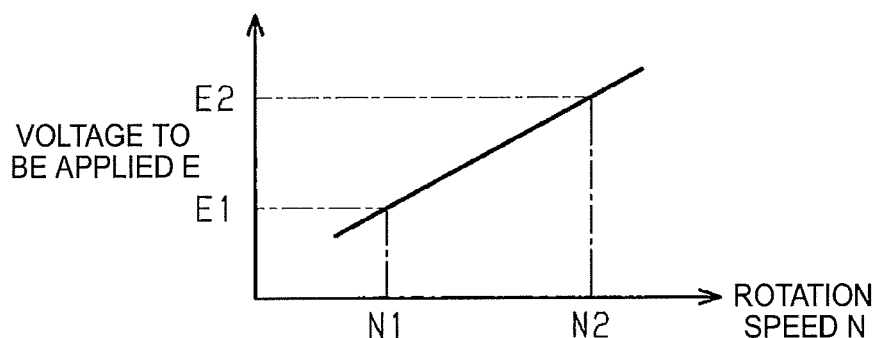
FIG. 4 is a graph illustrating a relationship between a rotation speed of the motor and the voltage that is applied to the motor.

In practice, it is preferable that the assist control unit 22 determines the voltage E that is applied to the motor 11 based on a map illustrated in FIG. 4 such that the manual operation force of the operator can be constant during the assist opening/closing actuation, regardless of the rotation speed N of the motor 11.

The map illustrated in FIG. 4 is a map for determining the voltage E that is applied to the motor 11 based on the rotation speed N of the motor 11. As illustrated in FIG. 4, a first voltage E1, which is applied to the motor 11 when the rotation speed N of the motor 11 is a first rotation speed N1, is lower than a second voltage E2 when the rotation speed N of the motor 11 is a second rotation speed N2 higher than the first rotation speed N1. In other words, in the map illustrated in FIG. 4, as the rotation speed N of the motor 11 increases, the voltage E that is applied to the motor 11 increases. As described above, a gradient of the voltage E with respect to the rotation speed N is set such that the manual operation force of the operator is constant during the assist opening/closing actuation. Therefore, it is preferable that the gradient of the voltage E with respect to the rotation speed N is obtained, based on experiments, simulations, or the like in advance.

The actuation finish determination unit 23 (control device 20) determines whether or not the finish condition of the assist opening/closing actuation is satisfied, in order to finish the assist opening/closing actuation depending on a stop or the like of the operation of the back door 4 by the operator. To be more specific, the actuation finish determination unit 23 determines whether or not the finish condition of the assist opening/closing actuation is satisfied, depending on whether or not a change amount dN of the rotation speed N of the motor 11 per unit time Tu is smaller than a determination change amount dNth.

In other words, the actuation finish determination unit 23 determines whether or not the finish condition of the assist opening/closing actuation is satisfied, based on a change amount of the opening/closing speed of the back door 4 per unit time Tu. To be more specific, the actuation finish determination unit 23 determines whether or not the finish condition of the assist opening/closing actuation is satisfied, depending on whether or not a "change amount of the opening/closing speed" of the back door 4 per unit time Tu is smaller than the determination change amount dNth.

In the embodiment, the change amount dN of the rotation speed N of the motor 11 per unit time Tu is set to a value obtained by subtracting, from the rotation speed N of the motor 11 at a certain timing, the rotation speed N of the motor 11 at a timing back from the timing described above by the unit time Tu. Therefore, the change amount dN of the rotation speed N of the motor 11 per unit time Tu is set to a positive value in a status in which the rotation speed N of the motor 11 increases, and the change amount is set to a negative value in a status in which the rotation speed N of the motor 11 decreases. In addition, a determination change amount dNth, which is compared with the change amount dN of the rotation speed N of the motor 11 per unit time Tu, is also set to a negative value.

Figure 5:
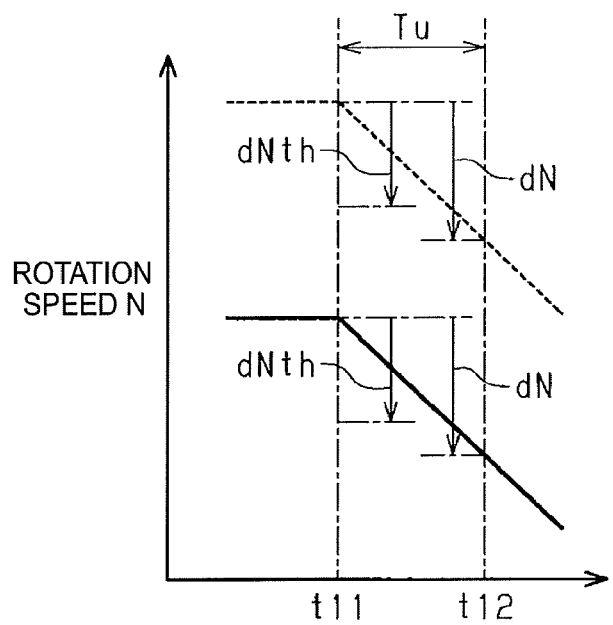
FIG. 5 is a timing chart illustrating a state in which a finish condition of the assist opening/closing actuation is satisfied.

For example, as illustrated by a solid line in FIG. 5, when the operator stops the operation of the back door 4 at a first timing t11, the manual operation force that is applied to the back door 4 is 0 (zero). Therefore, a load of the motor 11 increases, and the rotation speed N decreases from the first timing t11. In a case illustrated by a solid line in FIG. 5, the change amount dN of the rotation speed N in a period from the first timing t11 to a second timing t12 as the unit time Tu elapses is smaller than the determination change amount dNth. Therefore, in the case illustrated by the solid line in FIG. 5, the assist opening/closing actuation is finished at the second timing t12.

In addition, as illustrated by a dashed line in FIG. 5, even in a case where the rotation speed N of the motor 11 is higher than that in the case illustrated by the solid line, the assist opening/closing actuation is finished in a case where the change amount dN of the rotation speed N in a period from the first timing t11 to the second timing t12 as the unit time Tu elapses is smaller than the determination change amount dNth. In other words, since the actuation finish determination unit 23 determines whether or not the finish condition of the assist opening/closing actuation is satisfied, based on the change amount dN of the rotation speed N per unit time Tu, the rotation speed N of the motor 11 does not influence a determination result of the finish condition of the assist opening/closing actuation.

However, in a case where the operator gradually decreases the manual operation force, there is a possibility that the change amount dN of the rotation speed N per unit time Tu will not be smaller than the determination change amount dNth even though the back door 4 is about to be stopped. In this respect, the actuation finish determination unit 23 determines that the finish condition of the assist opening/closing actuation is satisfied, even in a case where the rotation speed N of the motor 11 is lower than a predetermined finish determination rotation speed Nth2.

It is preferable that the unit time Tu, the determination change amount dNth, and the finish determination rotation speed Nth2 are appropriately determined taking a likelihood of satisfaction of the finish condition of the assist opening/closing actuation into consideration. However, it is preferable that the unit time Tu and the determination change amount dNth are set to values by which it is possible to clearly discriminate between a case where the operator decreases the manual operation force in order to decrease the opening/closing speed of the back door 4 and a case where the operator decreases the manual operation force in order to stop the opening/closing actuation of the back door 4. In other words, it is preferable that the unit time Tu and the determination change amount dNth are set so as to be able to suppress an occurrence of a stop of the opening/closing actuation of the back door 4 in a case where the operator wants to decrease the opening/closing speed of the back door 4 or an occurrence of a decrease of the opening/closing actuation of the back door 4 in a case where the operator wants to stop the back door 4.

Next, a flow of a process that is executed by the control device 20 in order to perform the assist opening/closing actuation will be described with reference to a flowchart illustrated in FIG. 6.

Figure 6:
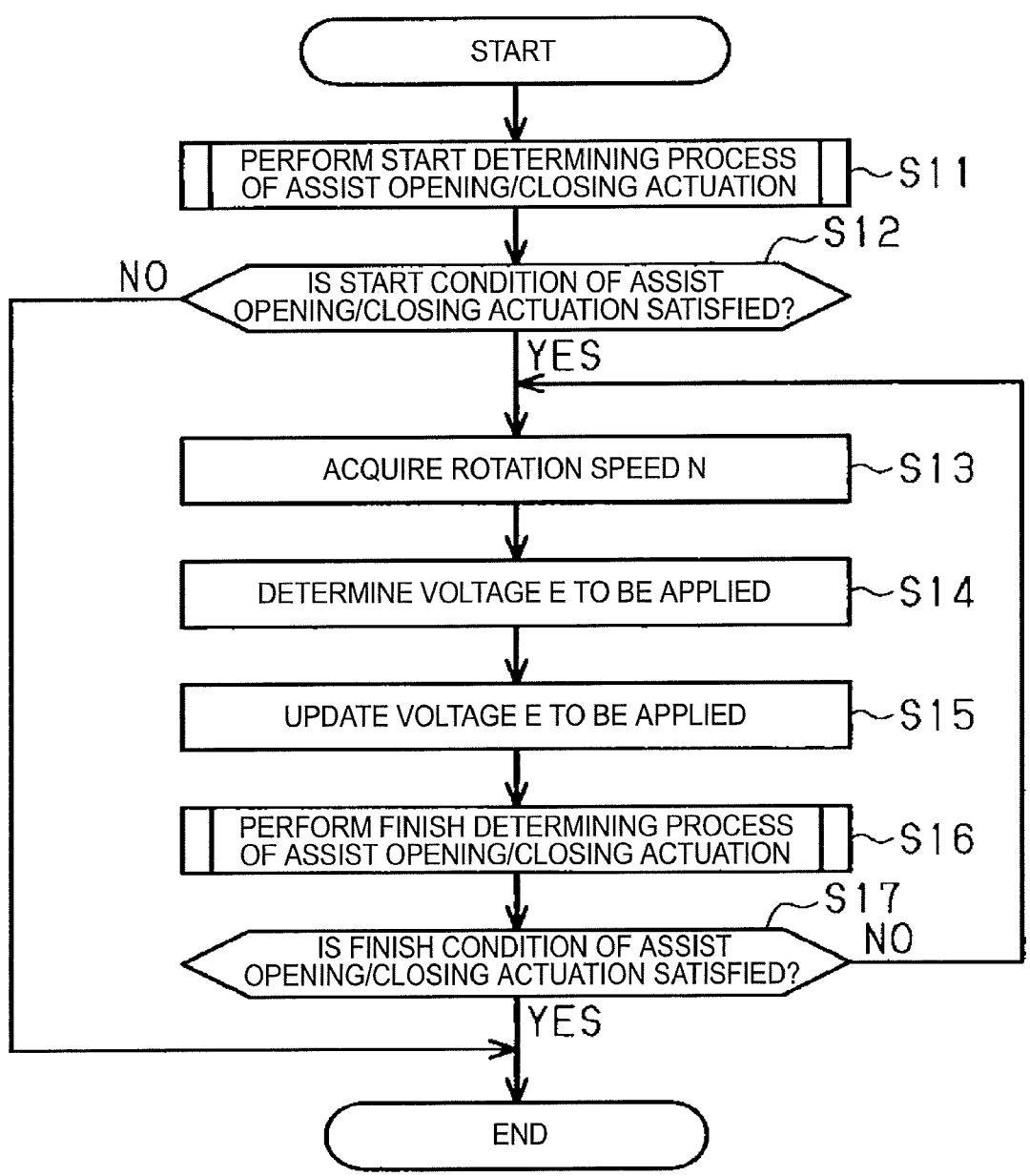
FIG. 6 is a flowchart illustrating a flow of a process that is executed by the vehicle opening/closing body control device in order to perform the assist opening/closing actuation.

As illustrated in FIG. 6, the control device 20 executes a start determining process of the assist opening/closing actuation (Step S11). Subsequently, the control device 20 determines whether or not the start condition of the assist opening/closing actuation is satisfied, based on a process result in Step S11 (Step S12). In a case where the start condition of the assist opening/closing actuation is not satisfied (Step S12: NO), the control device 20 ends the process. On the other hand, in a case where the start condition of the assist opening/closing actuation is satisfied (Step S12: YES), the control device 20 calculates the rotation speed N of the motor 11 based on the detection signal from the rotation angle sensor 12 (Step S13). Subsequently, the control device 20 determines the voltage E that is applied to the motor 11 with reference to the map illustrated in FIG. 4 (Step S14). The control device 20 updates the voltage E that is applied to the motor 11 to the voltage E determined in Step S14 (Step S15).

In Steps S13 to S15, in a case where the operator increases the manual operation force, the voltage E that is applied to the motor 11 increases in that the rotation speed N of the motor 11 increases. On the other hand, in a case where the operator decreases the manual operation force, the voltage E that is applied to the motor 11 decreases in that the rotation speed N of the motor 11 decreases. In this manner, in Steps S13 to S15, the control device 20 updates the opening/closing speed of the back door 4 to the opening/closing speed obtained by reflecting the operators intention.

The control device 20 executes a finish determining process of the assist opening/closing actuation (Step S16). Then, the control device 20 determines whether or not the finish condition of the assist opening/closing actuation is satisfied, based on a process result in Step S16 (Step S17). In a case where the finish condition of the assist opening/closing actuation is not satisfied (Step S17: NO), the control device 20 causes the process to proceed to Step S13. On the other hand, in a case where the finish condition of the assist opening/closing actuation is satisfied (Step S17: YES), the control device 20 ends the process after the voltage that is applied to the motor 11 becomes 0 (zero).

Subsequently, the start determining process of the assist opening/closing actuation in Step S11 will be described with reference to a flowchart illustrated in FIG. 7.

Figure 7:
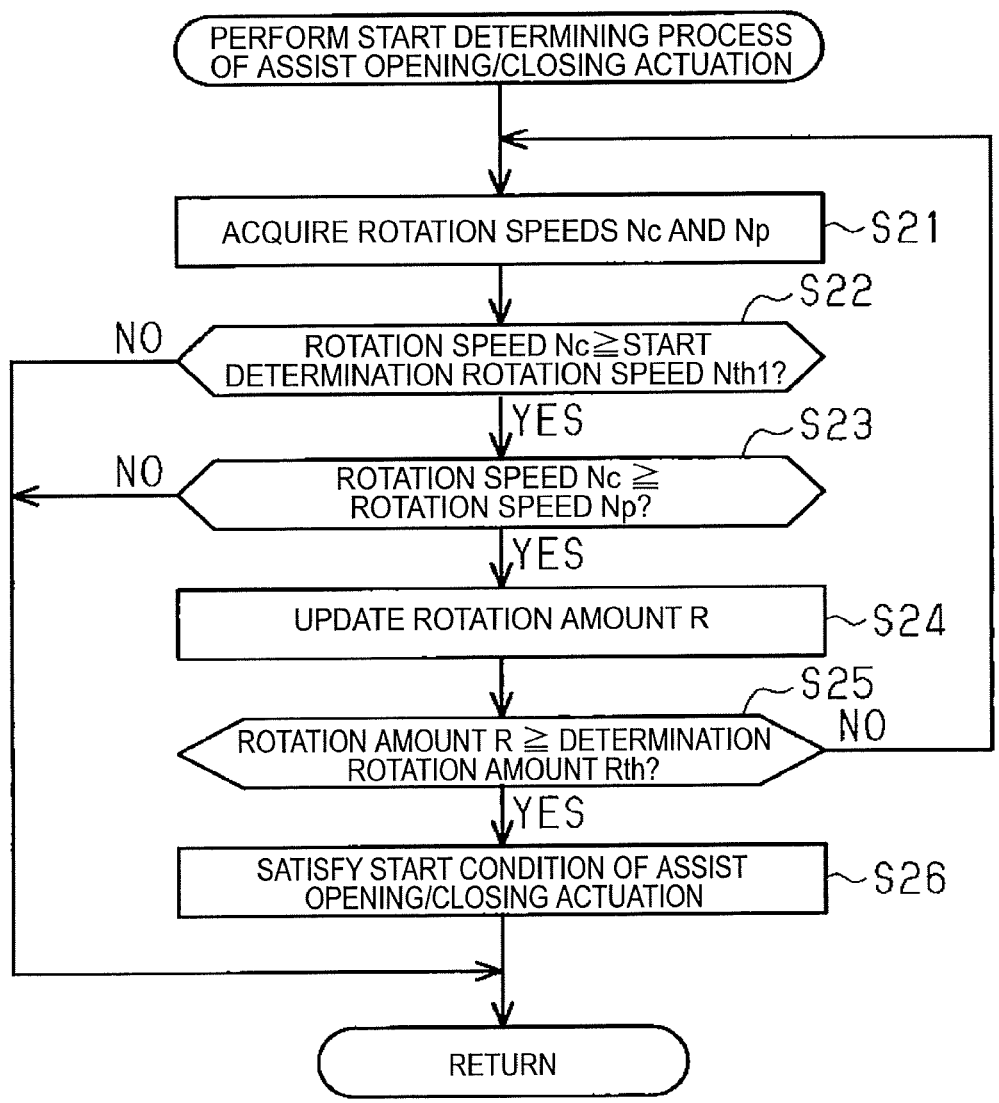
FIG. 7 is a flowchart illustrating a start determination process routine of the assist opening/closing actuation.

As illustrated in FIG. 7, the control device 20 acquires a rotation speed Nc, which is a current rotation speed N of the motor 11, and a rotation speed Np, which is a past current rotation speed N of the motor 11 (Step S21). In a case where a cycle from a start of the process to execution of Step S21 by the control device 20 is set as a first cycle, similar to the rotation speed Nc, the rotation speed Np may be the current rotation speed N of the motor 11. On the other hand, in a case where a cycle from a start of the process to execution of Step S21 by the control device 20 is set as a second or later cycle, the rotation speed Np may be the current rotation speed Nc when Step S21 is executed in the previous step.

The control device 20 determines whether or not the current rotation speed Nc is equal to or higher than the start determination rotation speed Nth1 (Step S22). In a case where the rotation speed Nc is lower than the start determination rotation speed Nth1 (Step S22: NO), the control device 20 ends the process. In this case, the start condition of the assist opening/closing actuation is not satisfied. On the other hand, in a case where the rotation speed Nc is equal to or higher than the start determination rotation speed Nth1 (Step S22: YES), the control device 20 determines whether or not the current rotation speed Nc is equal to or higher than the past rotation speed Np (Step S23). In a case where the rotation speed Nc is lower than the rotation speed Np (Step S23: NO), the control device 20 ends the process in a case where the rotation speed N of the motor 11 decreases. Even in this case, the start condition of the assist opening/closing actuation is not satisfied.

On the other hand, in a case where the rotation speed Nc is equal to or higher than the rotation speed Np (Step S23: YES), that is, in a case where the rotation speed N of the motor 11 does not decrease, the control device 20 updates the integrated value of the rotation amounts R of the motor 11 after first positive determination is obtained in Step S22 after the process is started, based on the output signal of the rotation angle sensor 12 (Step S24).

The control device 20 determines whether or not the rotation amount R of the motor 11 is equal to or larger than the determination rotation amount Rth (Step S25). In a case where the rotation amount R of the motor 11 is smaller than the determination rotation amount Rth (Step S25: NO), the control device 20 causes the process to proceed to previous Step S21. On the other hand, in a case where the rotation amount R of the motor 11 is equal to or larger than the determination rotation amount Rth (Step S25: YES), the control device 20 determines that the start condition of the assist opening/closing actuation is satisfied (Step S26). Then, the control device 20 ends the process.

Subsequently, the start determining process of the assist opening/closing actuation in Step S17 will be described with reference to a flowchart illustrated in FIG. 8.

Figure 8:
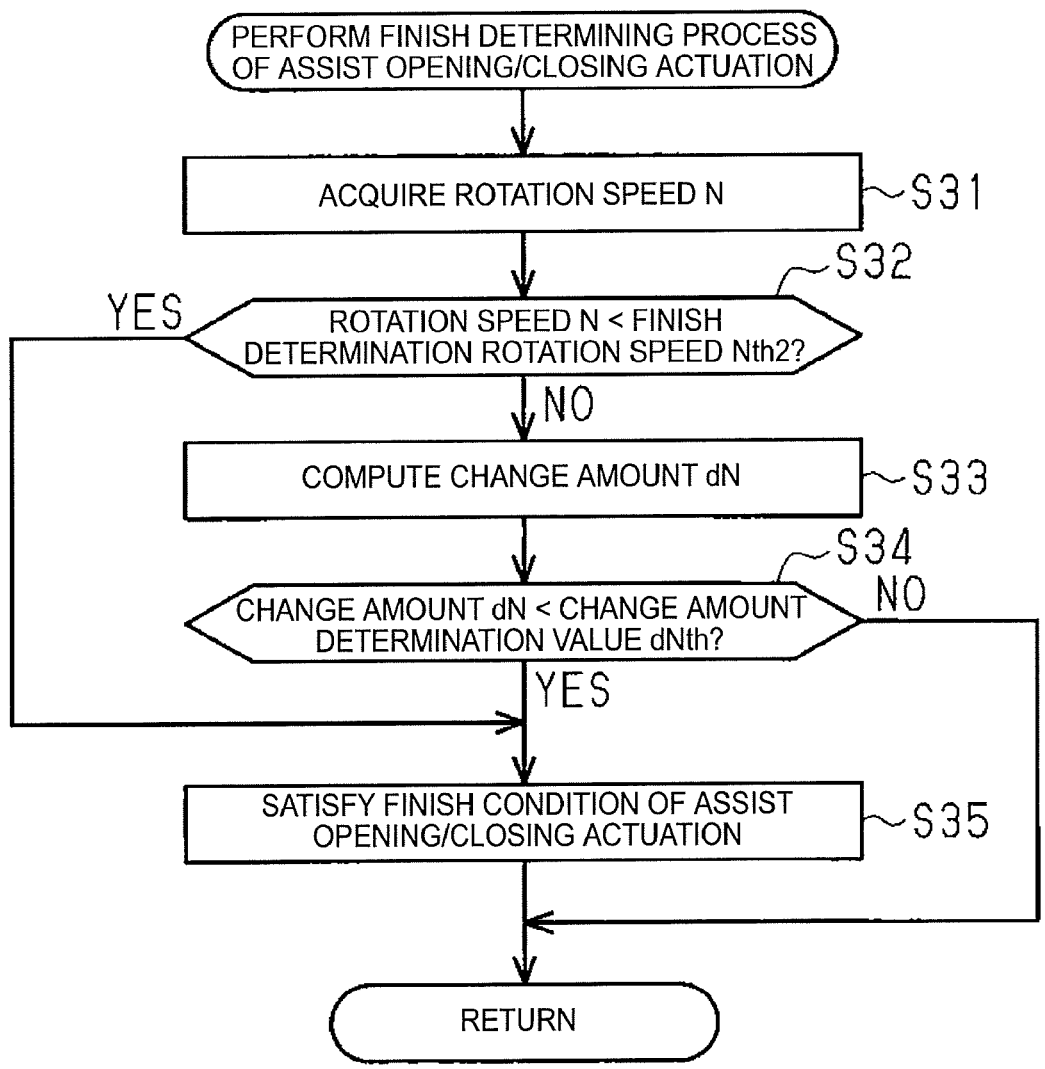
FIG. 8 is a flowchart illustrating a finish determination process routine of the assist opening/closing actuation.

As illustrated in FIG. 8, the control device 20 acquires the current rotation speed N of the motor 11 (Step S31). Subsequently, the control device 20 determines whether or not the rotation speed N is lower than the finish determination rotation speed Nth2 (Step S32). On the other hand, in a case where the rotation speed N is lower than the finish determination rotation speed Nth2 (Step S32: YES), the control device 20 determines that the finish condition of the assist opening/closing actuation is satisfied (Step S35). Then, the control device 20 ends the process.

On the other hand, in a case where the rotation speed N is equal to or higher than the finish determination rotation speed Nth2 (Step S32: NO), the control device 20 computes the change amount dN of the rotation speed N of the motor 11 per unit time Tu (Step S33). For example, the control device 20 may compute the change amount dN of the rotation speed N by subtracting, from the rotation speed N acquired in Step S31, the rotation speed N of the motor 11 at a timing back by the unit time Tu from the timing at which the rotation speed N is acquired in Step S31.

The control device 20 determines whether or not the change amount dN of the rotation speed N of the motor 11 is smaller than the determination change amount dNth (Step S34). In a case where the change amount dN of the rotation speed N of the motor 11 is equal to or larger than the determination change amount dNth (Step S34: NO), the control device 20 ends the process. In this case, the finish condition of the assist opening/closing actuation is not satisfied.

On the other hand, in a case where the change amount dN of the rotation speed N of the motor 11 is smaller than the determination change amount dNth (Step S34: YES), the control device 20 determines that the finish condition of the assist opening/closing actuation is satisfied (Step S35). Then, the control device 20 ends the process.

The operations and the effects of the embodiment will be described.

(1) In a case where an operator wants to finish the assist opening/closing actuation of the back door 4, the operator stops an operation of the back door 4 or applies a force to the back door 4 in a direction opposite to the actuation direction, in some cases. In this case, the manual operation force that is applied in the actuation direction of the back door 4 decreases, and thereby the opening/closing speed of the back door 4 decreases. In other words, the rotation speed N of the motor 11 decreases.

Here, with the control device that finishes the assist opening/closing actuation only in a case where the rotation speed N of the motor 11 is lower than the predetermined finish determination rotation speed Nth2, there is a possibility that the assist opening/closing actuation cannot be promptly finished depending on the rotation speed N of the motor 11 during the assist opening/closing actuation. For example, in a case where the rotation speed N of the motor 11 is slightly higher than the finish determination rotation speed Nth2 during the assist opening/closing actuation, the rotation speed N of the motor 11 is lower than the finish determination rotation speed Nth2 immediately after the operator stops the operation of the back door 4, and thereby the assist opening/closing actuation is finished promptly. Incidentally, in a case where the rotation speed N of the motor 11 is very higher than the finish determination rotation speed Nth2 during the assist opening/closing actuation, it is likely to take a long time until the rotation speed N of the motor 11 is lower than the finish determination rotation speed Nth2 even when the operator stops the operation of the back door 4, and the assist opening/closing actuation is not finished promptly.

In this respect, the control device 20 of the embodiment finishes the assist opening/closing actuation in a case where the change amount dN of the rotation speed N of the motor 11 per unit time Tu is smaller than the determination change amount dNth. Therefore, the control device 20 is capable of finishing the assist opening/closing actuation in a case where the manual operation force that is applied in the actuation direction of the back door 4 by the operator decreases, regardless of the rotation speed N of the motor 11 during the assist opening/closing actuation. Hence, the control device 20 can enhance operator convenience in that it is possible to reflect the operator's intention of finishing the assist opening/closing actuation.

(2) In a case where the operator wants to increase the opening/closing speed of the back door 4 during the assist opening/closing actuation, the operator increases the manual operation force that is applied in the actuation direction of the back door 4, in some cases. However, in this case, the opening/closing speed of the back door 4 increases, whereas a burden on the operator increases. In this respect, the control device 20 of the embodiment increases the voltage E that is applied to the motor 11 in a case where the opening/closing speed of the back door 4 (the rotation speed N of the motor 11) increases. In other words, the control device 20 increases the assist force of the motor 11 such that the burden on the operator does not increase. Therefore, the control device 20 is capable of reflecting the operator's intention of increasing the opening/closing speed of the back door 4 while suppressing an increase in the burden on the operator, during the assist opening/closing actuation.

(3) In a case where the operator wants to decrease the opening/closing speed of the back door 4 during the assist opening/closing actuation, the operator decreases the manual operation force that is applied in the actuation direction of the back door 4, in some cases. However, in this case, when the assist force of the motor 11 is higher than the manual operation force of the operator, the opening/closing speed of the back door 4 does not sufficiently decrease, in some cases. In this respect, the control device 20 of the embodiment decreases the voltage E that is applied to the motor 11 in a case where the opening/closing speed of the back door 4 (the rotation speed N of the motor 11) decreases. In other words, the control device 20 decreases the assist force of the motor 11 such that the opening/closing speed of the back door 4 decreases sufficiently. Therefore, the control device 20 is capable of reflecting the operator's intention of decreasing the opening/closing speed of the back door 4 during the assist opening/closing actuation.

(4) The control device 20 changes the voltage E that is applied to the motor 11 such that the manual operation force is constant in a case where the rotation speed N of the motor 11 changes depending on the opening/closing speed of the back door 4, during the assist opening/closing actuation. Therefore, the control device 20 enables the manual operation force of the operator to be constant even in a case where the opening/closing speed of the back door 4 changes during the assist opening/closing actuation. In other words, the operator can operate opening and closing of the back door 4 in the same manner, regardless of the opening/closing speed of the back door 4. As a result, the control device 20 can enhance operator convenience.

(5) For example, with the control device that starts the assist opening/closing actuation in a case where the rotation speed N of the motor 11 is equal to or higher than the start determination rotation speed Nth1, there is a possibility that the assist opening/closing actuation will be re-started immediately after the finish of the assist opening/closing actuation when the rotation speed N of the motor 11 at the time of the finish of the assist opening/closing actuation is equal to or higher than the start determination rotation speed Nth1.

By comparison, the control device 20 of the embodiment determines that the start condition of the assist opening/closing actuation is satisfied in the case where the rotation speed N of the motor 11 does not decrease in a period from a timing when the opening/closing speed is equal to or higher than the start determination rotation speed Nth1 to a timing when the integrated value of the rotation amounts R of the motor 11 becomes the determination rotation amount Rth. Therefore, the control device 20 enables the assist opening/closing actuation not to be re-started in a case where the back door 4 continues performing the opening/closing actuation at the opening/closing speed equal to or higher than the start determining speed Nth1 due to the inertia or the like after the finish of the assist opening/closing actuation. Hence, the control device 20 is capable of suppressing an inadvertent re-start of the assist opening/closing actuation after the finish of the assist opening/closing actuation.

(6) The control device 20 finishes the assist opening/closing actuation even in a case where the rotation speed N of the motor 11 is lower than the finish determination rotation speed Nth2. Hence, the control device 20 is capable of avoiding a situation in which it is not possible to finish the assist opening/closing actuation even in a case where the rotation speed N of the motor 11 decreases gradually, in other words, even in a case where the positive determination is not performed in Step S34.

The embodiment can be modified and embodied as follows. The embodiment and the following modification examples can be combined with each other so as to be embodied in a range in which the embodiment and the following modification examples are technically compatible with each other.

The change amount dN of the rotation speed N of the motor 11 per unit time Tu is also referred to as a time differential value of the rotation speed N of the motor 11. In this respect, the control device 20 may compute the time differential value of the rotation speed N of the motor 11 in the start determining process and the finish determining process of the assist opening/closing actuation. Here, the time differential value is a positive value in a case where the rotation speed N of the motor 11 increases as time elapses, and the time differential value is a negative value in a case where the rotation speed N of the motor 11 decreases as time elapses. The control device 20 may determine that the start condition of the assist opening/closing actuation is satisfied in a case where the time differential value of the rotation speed N of the motor 11 is equal to or larger than a predetermined start differential determination value, and the control device may determine that the finish condition of the assist opening/closing actuation is satisfied in a case where the time differential value of the rotation speed N of the motor 11 is smaller than a predetermined finish differential determination value.

The control device 20 may not update the voltage E that is applied to the motor 11, in Step S15, regardless of the rotation speed N of the motor 11. That is, the control device 20 may set a constant voltage E that is applied to the motor 11.

The control device 20 may substitute the rotation amount R and the rotation speed N of the motor 11 that is used in the processes illustrated in FIGS. 6 to 8 with a rotation amount (opening/closing amount) and a rotation speed (opening/closing speed) of the back door 4. In this case, the control device 20 may acquire the rotation amount and the rotation speed of the back door 4 based on the detection signal of the rotation amount sensor such as a potentiometer provided on a rotation shaft of the back door 4.

In addition, the control device 20 may substitute the rotation amount R and the rotation speed N of the motor 11 that is used in the processes illustrated in FIGS. 6 to 8 with an extension/retraction amount and an extension/retraction speed of the actuator 10. In this case, the control device 20 may acquire the extension/retraction amount and the extension/retraction speed of the actuator 10 based on a detection signal of a displacement sensor such as a linear sensor rotation amount sensor provided on the actuator 10.

The control device 20 may execute the processes illustrated in FIGS. 6 to 8 during actuation of at least one of a case where the back door 4 performs an opening actuation and a case where the back door 4 performs a closing actuation.

The control device 20 may be a control device that controls an opening/closing actuation of another opening/closing body that is provided in the vehicle 1. For example, the control device 20 may be a control device that controls an opening/closing actuation of a slide door or a swing door that is provided on a side of in the vehicle 1.

A vehicle opening/closing body control device according to an aspect of this disclosure includes: an assist control unit that applies a voltage to a motor which drives an opening/closing body of a vehicle so as to perform an assist opening/closing actuation that assists a manual operation force with respect to the opening/closing body for performing opening/closing actuation of the opening/closing body; and an actuation finish determination unit that determines whether or not a finish condition of the assist opening/closing actuation is satisfied, based on a change amount of an opening/closing speed of the opening/closing body per unit time. The assist control unit stops applying the voltage to the motor in a case where the finish condition of the assist opening/closing actuation is satisfied.

In a case where an operator wants to finish the assist opening/closing actuation of the opening/closing body, the operator stops an operation of the opening/closing body or applies a force to the opening/closing body in a direction opposite to an actuation direction, in some cases. In this case, the manual operation force that is applied in the actuation direction of the opening/closing body decreases, and thereby an opening/closing speed of the opening/closing body decreases.

In this respect, the vehicle opening/closing body control device having such a configuration described above determines whether or not a finish condition of the assist opening/closing actuation is satisfied, based on a change amount of the opening/closing speed of the opening/closing body per unit time (deceleration of the opening/closing body). Therefore, the vehicle opening/closing body control device is capable of finishing the assist opening/closing actuation in a case where the manual operation force that is applied in the actuation direction of the opening/closing body by the operator decreases, regardless of the opening/closing speed of the opening/closing body during the assist opening/closing actuation. Hence, the vehicle opening/closing body control device can enhance operator convenience in that it is possible to reflect an operator's intention of finishing the assist opening/closing actuation.

In the vehicle opening/closing body control device described above, it is preferable that the assist control unit increases the voltage that is applied to the motor in a case where the opening/closing speed increases during the assist opening/closing actuation.

In a case where the operator wants to increase the opening/closing speed of the opening/closing body during the assist opening/closing actuation, the operator increases the manual operation force that is applied in the actuation direction of the opening/closing body, in some cases. However, in this case, the opening/closing speed of the opening/closing body increases, whereas a burden on the operator increases. In this respect, the vehicle opening/closing body control device having such a configuration described above increases the voltage that is applied to the motor in a case where the opening/closing speed of the opening/closing body increases. In other words, the vehicle opening/closing body control device increases an assist force of the motor such that the burden on the operator does not increase. Therefore, the vehicle opening/closing body control device is capable of reflecting the operator's intention of increasing the opening/closing speed of the opening/closing body while suppressing an increase in the burden on the operator, during the assist opening/closing actuation.

In the vehicle opening/closing body control device described above, it is preferable that the assist control unit decreases the voltage that is applied to the motor in a case where the opening/closing speed decreases during the assist opening/closing actuation.

In a case where the operator wants to decrease the opening/closing speed of the opening/closing body during the assist opening/closing actuation, the operator decreases the manual operation force that is applied in the actuation direction of the opening/closing body, in some cases. However, in this case, although the opening/closing speed of the opening/closing body decreases, the opening/closing speed of the opening/closing body does not sufficiently decrease depending on a degree of the assist force of the motor, in some cases. In this respect, the vehicle opening/closing body control device having such a configuration described above decreases the voltage that is applied to the motor in a case where the opening/closing speed of the opening/closing body decreases. In other words, the vehicle opening/closing body control device decreases the assist force of the motor such that the opening/closing speed of the opening/closing body decreases. Therefore, the vehicle opening/closing body control device is capable of reflecting the operator's intention of decreasing the opening/closing speed of the opening/closing body during the assist opening/closing actuation.

In the vehicle opening/closing body control device described above, it is preferable that the assist control unit changes the voltage that is applied to the motor such that the manual operation force is constant in a case where the opening/closing speed changes during the assist opening/closing actuation.

According to the configuration described above, the vehicle opening/closing body control device enables the manual operation force of the operator to be constant even in a case where the opening/closing speed of the opening/closing body changes during the assist opening/closing actuation. Therefore, the operator can operate the opening/closing body in the same manner, regardless of the opening/closing speed of the opening/closing body. That is, the vehicle opening/closing body control device can enhance operator convenience.

It is preferable that the vehicle opening/closing body control device described above further includes an actuation start determination unit that determines that a start condition of the assist opening/closing actuation is satisfied in a case where a status in which the opening/closing speed does not decrease after the opening/closing speed reaches a start determining speed or higher is continued, and the assist control unit starts applying the voltage to the motor in a case where the start condition of the assist opening/closing actuation is satisfied.

For example, in the vehicle opening/closing body control device that determines that the assist opening/closing actuation starts in a case where the opening/closing speed is equal to or higher than the start determining speed, when the opening/closing speed of the opening/closing body at the time of the finish of the assist opening/closing actuation is equal to or higher than the start determining speed, there is a possibility that the assist opening/closing actuation will be re-started immediately after the finish of the assist opening/closing actuation.

By comparison, the vehicle opening/closing body control device having such a configuration described above determines that the start condition of the assist opening/closing actuation is satisfied in the case where the status in which the opening/closing speed of the opening/closing body does not decrease after the opening/closing speed a start determining speed or higher is continued. Therefore, the vehicle opening/closing body control device enables the assist opening/closing actuation not to be re-started even in a case where the opening/closing body continues performing the opening/closing actuation at an opening/closing speed equal to or higher than the start determining speed due to inertia or the like after the finish of the assist opening/closing actuation. Hence, the vehicle opening/closing body control device is capable of suppressing an inadvertent re-start of the assist opening/closing actuation after the finish of the assist opening/closing actuation.

According to the vehicle opening/closing body control device, it is possible to enhance operator convenience.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle opening/closing body control device comprising:
   a processor configured to:
   apply a voltage to a motor which drives an opening/closing body of a vehicle so as to perform an assist opening/closing actuation that assists a manual operation force with respect to the opening/closing body for performing an opening/closing actuation of the opening/closing body;
   determine whether or not a finish condition of the assist opening/closing actuation is satisfied based on a change amount of an opening/closing speed of the opening/closing body per unit time; and
   stop applying the voltage to the motor in a case where the finish condition of the assist opening/closing actuation is satisfied.

2. The vehicle opening/closing body control device according to claim 1, wherein the processor is configured to increase the voltage that is applied to the motor in a case where the opening/closing speed increases during the assist opening/closing actuation.

3. The vehicle opening/closing body control device according to claim 2, wherein the processor is configured to decrease the voltage that is applied to the motor in a case where the opening/closing speed decreases during the assist opening/closing actuation.

4. The vehicle opening/closing body control device according to claim 3, wherein the processor is configured to decrease the voltage that is applied to the motor in a case where the opening/closing speed decreases during the manual operation force.

5. The vehicle opening/closing body control device according to claim 2, wherein the processor is configured to change the voltage that is applied to the motor such that the manual operation force is constant in a case where the opening/closing speed changes during the assist opening/closing actuation.

6. The vehicle opening/closing body control device according to claim 5, wherein the processor is configured to:
   determine that a start condition of the assist opening/closing actuation is satisfied in a case where a status, in which the opening/closing speed does not decrease after the opening/closing speed reaches a start determining speed or higher, is continued for a predetermined time, and
   start applying the voltage to the motor in a case where the start condition of the assist opening/closing actuation is satisfied.

7. The vehicle opening/closing body control device according to claim 2, wherein the processor is configured to:
   determine that a start condition of the assist opening/closing actuation is satisfied in a case where a status, in which the opening/closing speed does not decrease after the opening/closing speed reaches a start determining speed or higher, is continued for a predetermined time, and
   start applying the voltage to the motor in a case where the start condition of the assist opening/closing actuation is satisfied.

8. The vehicle opening/closing body control device according to claim 1, wherein the processor is configured to decrease the voltage that is applied to the motor in a case where the opening/closing speed decreases during the assist opening/closing actuation.

9. The vehicle opening/closing body control device according to claim 8, wherein the processor is configured to change the voltage that is applied to the motor such that the manual operation force is constant in a case where the opening/closing speed changes during the assist opening/closing actuation.

10. The vehicle opening/closing body control device according to claim 8, wherein the processor is configured to:
    determine that a start condition of the assist opening/closing actuation is satisfied in a case where a status, in which the opening/closing speed does not decrease after the opening/closing speed reaches a start determining speed or higher, is continued for a predetermined time, and
    start applying the voltage to the motor in a case where the start condition of the assist opening/closing actuation is satisfied.

11. The vehicle opening/closing body control device according to claim 8, wherein the processor is configured to decrease the voltage that is applied to the motor in a case where the opening/closing speed decreases during the manual operation force.

12. The vehicle opening/closing body control device according to claim 1, wherein the processor is configured to:
    determine that a start condition of the assist opening/closing actuation is satisfied in a case where a status, in which the opening/closing speed does not decrease after the opening/closing speed reaches a start determining speed or higher, is continued for a predetermined time, and
    start applying the voltage to the motor in a case where the start condition of the assist opening/closing actuation is satisfied.

13. The vehicle opening/closing body control device according to claim 12, wherein the predetermined time is determined based upon an opening/closing amount of the opening/closing body.

14. The vehicle opening/closing body control device according to claim 13, wherein the predetermined time is a time when the opening/closing amount is equal to or larger than a determination opening/closing amount.

15. The vehicle opening/closing body control device according to claim 1, wherein the change amount of the opening/closing speed of the opening/closing body per unit time corresponds to a change of the manual operation force.

16. The vehicle opening/closing body control device according to claim 15, wherein the processor is configured to decrease the voltage that is applied to the motor in a case where the opening/closing speed decreases during the assist opening/closing actuation.

17. The vehicle opening/closing body control device according to claim 15, wherein the processor is configured to change the voltage that is applied to the motor such that the manual operation force is constant in a case where the opening/closing speed changes during the assist opening/closing actuation.

\* \* \* \* \*